United States Patent [19]

Williams et al.

[11] 3,921,002
[45] Nov. 18, 1975

[54] OZONE GENERATOR

[75] Inventors: Laurence O. Williams; Robert T. Anselmi, both of Littleton, Colo.

[73] Assignee: Martin Marietta Corporation, New York, N.Y.

[22] Filed: Apr. 22, 1974

[21] Appl. No.: 462,622

[52] U.S. Cl. ............... 250/533; 23/281; 23/282; 204/176; 250/539; 250/540; 250/541; 423/581
[51] Int. Cl.² ............... C01B 13/10; C01B 13/11
[58] Field of Search ............ 204/176; 250/533, 539, 250/540, 541; 423/581; 23/281, 282

[56] References Cited
UNITED STATES PATENTS

| | | | |
|---|---|---|---|
| 982,587 | 1/1911 | Gerard | 250/540 X |
| 2,876,188 | 3/1959 | Thorp et al. | 204/176 |
| 3,038,790 | 6/1962 | Beggs et al. | 23/281 |
| 3,511,768 | 5/1970 | Bartle et al. | 250/540 |
| 3,616,382 | 10/1971 | Bartle et al. | 204/176 |
| 3,661,763 | 5/1972 | Cremer et al. | 250/540 |

*Primary Examiner*—John H. Mack
*Assistant Examiner*—Aaron Weisstuch

[57] ABSTRACT

An improved ozone generator includes a cryogenically cooled reaction chamber in which gaseous oxygen well below the boiling point of ozone is subjected to a corona discharge and forms liquid ozone. The discharge portion of the reaction chamber holds a body of liquid ozone to block the flow of unreacted oxygen from the reaction chamber. A bed of glass particles within the body of liquid helps to suppress explosive decomposition of the ozone. A temperature gradient across the discharge portion of the reaction chamber permits the ozone to volatilize to a gas and exit the reaction chamber in a smooth, controllable manner.

11 Claims, 4 Drawing Figures

OZONE GENERATOR

BACKGROUND OF THE INVENTION

The present invention relates to an improved apparatus for converting oxygen to ozone. Specifically, the present invention relates to an ozone generator wherein substantially all of the input gaseous oxygen is reacted to form liquid ozone.

Ozone is a volatile blue-colored liquid, of characteristic odor (somewhat similar to that of chlorine), generally formed when ordinary oxygen is subjected to electrostatic discharge. Because of the potential explosiveness of both gaseous and liquid ozone it is important that ozone generation apparatus be designed in a manner to minimize the risk of explosive decomposition of the ozone.

Ozone has been found to be useful for many different purposes. Specification, ozone may be used in waste treatment systems to oxidize materials such as cyanides and phenols in waste water, as well as for disinfecting water without introducing the foreign chemical taste and odors of materials such as chlorine or phenols. Another use of ozone is for ozonolysis of unsaturated organic acids, such as oleic acid, in the preparation of plasticizers for polyvinyl chloride and other plastics.

A known ozone generator which cryogenically cools the ozone, collects it in liquid form and stores the liquid ozone for future use, is disclosed in U.S. Pat. No. 2,876,188. Another known ozone generator is disclosed in U.S. Pat. No. 3,511,768 as being operable to cryogenically cool the ozone to a solid state and operates to discontinuously discharge the ozone in gaseous form. Other ozone generators operate at substantially ambient temperatures with the ozone always in its gaseous state, see U.S. Pat. No. 3,214,364.

SUMMARY OF THE PRESENT INVENTION

The present invention relates to an ozone generator in which gaseous oxygen is continuously fed to a cryogenically cooled reaction chamber wherein it is subjected to a corona discharge to form liquid ozone, and wherefrom the ozone may exit in gaseous form in a smooth, continuous and controllable manner. The ozone generator of the present invention is constructed so as to convert substantially all of the gaseous oxygen supplied to it to ozone.

A liquid trap in the outlet portion of the reaction chamber collects the liquid ozone and a temperature gradient formed between the inside of the reaction chamber and the ozone discharge portion enables the ozone to volatilize as it exits from the reaction chamber. The liquid trap is designed to suppress explosive decomposition of the ozone and, in combination with the temperature gradient, permits ozone in its gaseous state to exit the trap in a smooth, continuous, and controllable manner.

Accordingly, it is an object of the present invention to provide an ozone generator wherein a continuous supply of gaseous oxygen is converted to liquid ozone, and wherein the ozone exits the generator in its gaseous state in a smooth, continuous, and controllable manner.

It is another object of the present invention to provide an ozone generator in which ozone is formed in its liquid state, and wherein the tendency of the ozone toward explosive decomposition is suppressed.

It is another object of the present invention to provide an extremely efficient ozone generator which is capable of converting substantially all of the oxygen introduced into a reaction chamber to ozone.

It is yet another object of the present invention to provide an ozone generator wherein a liquid ozone trap is effective to block the flow of unreacted oxygen out of the chamber and of ozone gas into the chamber.

BRIEF DESCRIPTION OF THE DRAWINGS

These and other objects and advantages of the present invention will be further apparent from the following description and the accompanying drawings wherein.

DESCRIPTION OF A PREFERRED EMBODIMENT OF THE INVENTION

Figure 1:
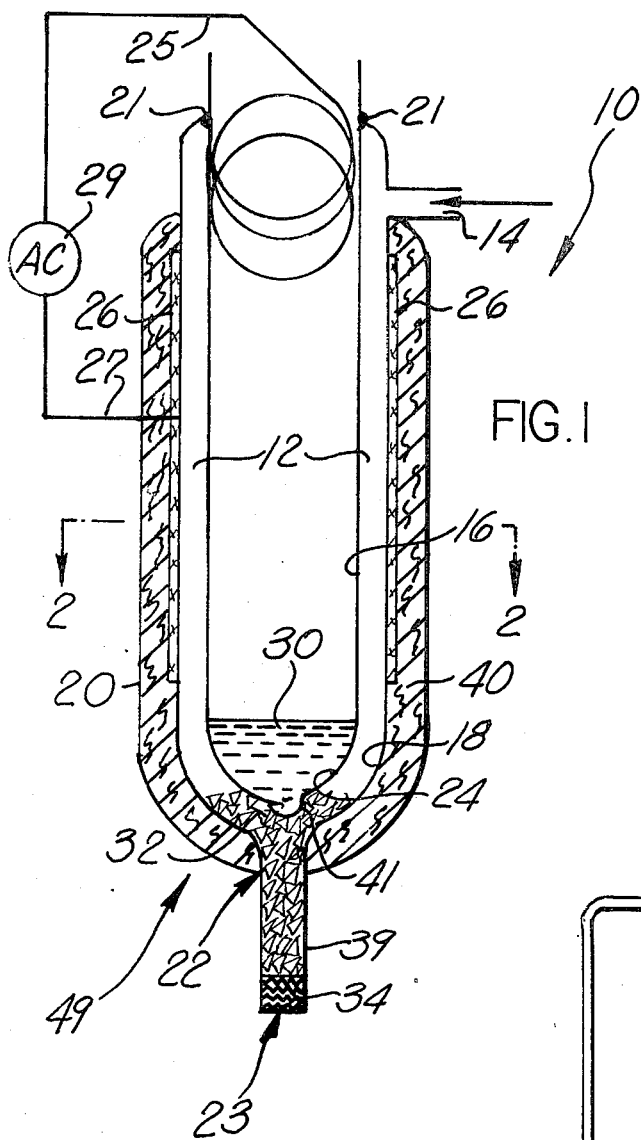
FIG. 1 is a cross-sectional view of an ozone generator constructed in accordance with the present invention.

The basic apparatus for generating ozone in accordance with the present invention may be seen by reference to FIG. 1. The ozone generator is generally designated 10 and includes a reaction chamber 12 which is supplied with gaseous oxygen, through inlet port 14, and in which the oxygen is converted to ozone.

A potential problem in the preparation of ozone by means of the subjection of gaseous oxygen to a corona discharge involves the possibility of explosions in the system being initiated by impurities in the oxygen gas used. Specifically, the impurities which might tend to cause undesirable effects would be those that contain hydrocarbons. In the present invention, the preferred embodiment contemplates the use of zero grade oxygen, so-called because the hydrocarbon impurity is specified to be negligible on a hydrocarbon analyzer.

Of course, it will be obvious to those skilled in the art that other sources of suitable oxygen are contemplated. Another way of producing oxygen which may be satisfactory for the practice of the present invention is disclosed in British Pat. No. 703,209, wherein the patentee passes oxygen gas over copper oxide at 900°C for removing the contaminants of a hydrocarbon nature by combustion to carbon dioxide. Three other potential sources of oxygen are research grade oxygen, ordinary bottle oxygen, and boil-off from liquid oxygen. Analytical data taken of the hydrocarbon impurity of each of the foregoing types of oxygen suggests that all shown nearly the same concentration of hydrocarbons as zero grade oxygen, as measured by a mass spectrometer. Therefore, analytical data supports the proposition that all of the above four sources of oxygen would be satisfactory for the practice of the present invention. However, in the preferred embodiment of the present invention, since zero-grade oxygen has been found to yield satisfactory results in actual testing of the apparatus, it is contemplated that zero-grade oxygen is preferable for the practice of the present invention.

Figure 2:
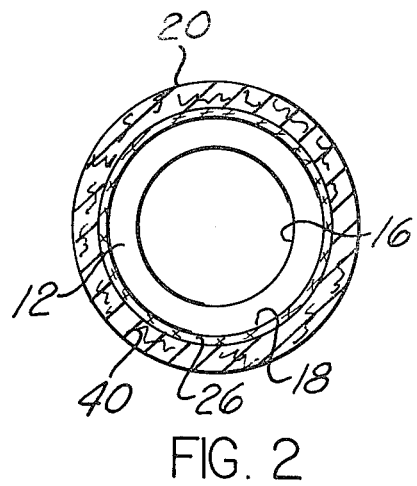
FIG. 2 is a sectional view along the line 2—2 of FIG. 1.

Referring agains to FIGS. 1 and 2, the longitudinally extending reaction chamber 12 has an annular cross-section (FIG. 2) and is generally tubular in configuration. The chamber 12 is formed between a tubular aluminum or other comparable non-catalytic metal inner wall 16 and a tubular glass outer wall 18. The glass outer wall 18 has a cylindrical discharge portion 22. The discharge portion 22 serves as a trap and holds a body of liquid ozone. In addition, the discharge portion 22 includes a heat exchanger for volatilization of the liquid ozone to gaseous ozone which is transmitted from the generator 10 through an outlet port 23 and from there to a use location, shown schematically at 43 in FIG. 3.

In the ozone generator of FIG. 1, the conversion of oxygen to ozone takes place within the space formed between inner wall 16 and the outer wall 18. Therefore, a suitable supply of gaseous oxygen (not shown) is connected, via suitable conduit means, to the inlet port 14 to supply the oxygen to the reaction chamber 12.

Means are provided to subject the gaseous oxygen to a corona discharge after the oxygen is injected into the reaction chamber. This is accomplished in the ozone generator, shown in FIG. 1, by utilizing the aluminum inner wall 16 as one electrode and wrapping the glass outer wall with aluminum foil to form an outer electrode 26.

Electrode wall 16 comprises an aluminum tube which, in the preferred embodiment, has an inner diameter of 1⅛" and an outer diameter of approximately 1½". The generally hemispherical end 24 of the wall 16 is closed with a bottom plug 41 which is machined and heliarced. The tubular inner electrode wall 16 is sealed with a force fit and TEFLON tape 21 which is overcoated with Dow Corning 92-009 sealant.

Outer electrode 26 comprises aluminum foil wrapped about the outer wall of the glass tube. A tinned copper wire is wrapped around the aluminum and twist-fastened to hold the electrode in place and to provide an electical contact for the said outer electrode. Both electrodes will be suitably connected, via copper leads 25, 27 to a gaseous tube transformer (represented schematically at 29) which supplies the potential between the electrodes.

The conversion of gaseous oxygen to ozone requires a substantial potential across the electrodes. In one specific embodiment of the invention a charge of 5,500 volts is required. Therefore, the transformer 29 must obviously be of a type which is suitable for providing such a potential. For this one embodiment of the invention, the potential is provided by a step-up transformer having a primary winding which when energized with a current 115 volts, 60 cycles, 360 V.A. provides a 12,000 volt potential across the leads 25 and 27. A suitable potentiometer is provided to vary the voltage applied to the primary winding of the transformer 29.

As can further be seen by FIG. 1, the volume enclosed by the inner electrode wall 16 is filled with liquid oxygen 30. The liquid oxygen acts as a cryogenic coolant for the inner electrode wall. Ozone will condense on the outer surface of the electrode wall 16 prior to being fed by gravity into the discharge portion 22. As will be evident from the discussion which follows, the present invention contemplates the formation of ozone in its liquid state. Therefore, the choice of liquid oxygen as a coolant is desirable because its boiling point is higher than the freezing point of ozone. It will be obvious to those of ordinary skill that other comparable coolants can be used.

With thermal insulation jacket 40 surrounding the reaction chamber, the liquid oxygen 30 serves to cryogenically cool the reaction chamber. The gaseous oxygen which is subjected to the corona discharge will therefore be at a temperature considerably below the boiling point of ozone (in fact, it will be close to 100° below the boiling point of ozone) when it is converted to ozone. This results in an almost instantaneous conversion of gaseous oxygen to liquid ozone.

Again, referring to FIG. 1, the discharge portion 22 which receives the liquid ozone is filled with crushed glass particles, labeled 32. These particles are, in one specific preferred embodiment, made of 48–64 U.S. mesh Pyrex. The bottom of the channel is fitted as at 34, with a plug which is of sintered glass. The plug 34 serves to hold the bed of crushed glass within the confines of the discharge portion 22 and to enable gaseous ozone to be conducted through the outlet port 23 to a suitable receiver. The glass bed preferably is extended onto the reaction chamber 12 to a level above the lowermost portion of the liquid oxygen coolant, as can be clearly seen by reference to FIG. 1.

The bed of crushed glass 32, held in place by the plug 34, thus forms a trap for the liquid ozone which is deposited therein by gravity flow over the lower part of the reaction chamber which contacts the cold, but electrically active, inner electrode wall 16. The liquid ozone, in turn, fills the bed and is held in place by capillary action. Therefore, a generally circular body of liquid ozone entends across the inlet to the discharge portion 22 to seal the discharge portion against passage of gaseous oxygen. However, if the oxygen feed rate exceeds the capability of the generator to convert input oxygen to ozone, the excess oxygen gas may, of course, channel through the liquid ozone seal.

Since the liquid ozone will gradually make its way, by gravity flow, toward the bottom of the trap it is important that the bead size for the embodiment set forth herein be within the range of the disclosed 48–64 U.S. mesh. If the glass beads are too small they may tend to become too solidly packed in the trap. This would tend to reduce or possibly eliminate the flow area for the liquid ozone within the trap. On the other hand, if the beads are too large they may permit too large a volume of liquid ozone and too rapid movement of the ozone. The latter situation also gives rise to the potential for explosive decomposition and propagation of the ozone and, of course, is therefore to be avoided. It has been found that if too large a volume of liquid ozone is present the ozone toward explosive decomposition and propagation. The beads prevent a large volume from being present and help to maintain the flow of the liquid ozone through the trap at an acceptable rate.

Thus the liquid ozone trap is designed to permit a very gradual but continuous gravity flow of liquid ozone toward the bottom of the trap. A trap designed in this manner serves a twofold purpose (1) it substantially blocks the discharge portion of the generator against passage of unreacted gaseous oxygen therethrough and (2) it blocks the discharge portion against ozone gas seeping back through the trap and mixing with the gaseous oxygen. The latter circumstance must be carefully guarded against because of the potential of explosive decomposition of the ozone.

By sealing the discharge portion 22 against passage of gaseous oxygen, the ozone trap assures that the primary voltage and the oxygen feed rate can be controlled so that substantially all, that is at least 90 percent, of the input oxygen is converted to ozone by the corona discharge. On the other hand, by permitting oxygen gas at higher than capacity flow rate to exit through the bed the liquid ozone trap will reduce the likelihood of an oxygen back pressure of undesirable and possibly dangerous proportions occurring.

A substantial oxygen back pressure within the reaction chamber is undersirable for a number of reasons. One potential problem is that the pressure itself might break the glass generator or the pressure buildup may sensitize the ozone to explosive decomposition. Also, since boiling points tend to increase with increased pressure, an increased back pressure might increase the boiling point of the gaseous oxygen to a point whereat a substantial portion of the input oxygen could condense to its liquid form and tend to mix with the liquid ozone in the trap and exit the generator therewith. Thus, the ozone trap in accordance with the present invention is specifically designed to allow oxygen at higher than capacity flow rate to channel therethrough.

Figure 3:
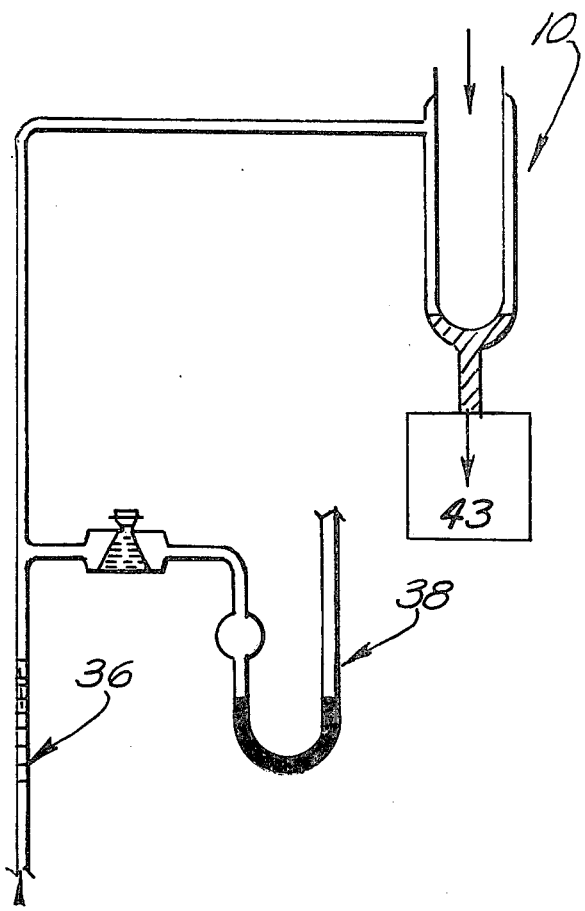
FIG. 3 is a schematic cross-sectional view of the ozone generator and combined with means for measuring the flow rate of the input oxygen and for detecting the presence of back pressure within the generator.

At the same time it is, of course, preferable that the flow rate of the input oxygen be suitable controlled so as to substantially reduce the likelihood of oxygen back pressure of undesirable proportions occurring within the system. To protect against such a pressure buildup, the system can be suitably provided, as shown in FIG. 3, with a flow rate detection means 36 for the detection of the rate that the oxygen is fed to the reaction chamber, and with manometer means 38 for detecting oxygen back pressure within the generator. Flow rate detection means 36, and manometer means 38 are conventional and need not be further elaborated upon. By suitably monitoring the input flow rate of the oxygen, and by detecting back pressure, the system can be adjusted, by controlling the primary voltage and the oxygen feed rate to the reaction chamber, so that a substantial percentage of the input oxygen will be suitably converted to ozone.

Referring again to FIG. 1, it will be seen that the outlet portion of the discharge portion 22 includes a glass neck 39 that is exposed to ambient temperature and that a substantial portion of the ozone generator is surrounded by a thermal insulation jacket 40. In the preferred embodiment, the insulation jacket is formed of fiberglass and the neck 39 is on the order of 8 mm outer diameter. The purpose of the exposed neck portion 39 and the insulation jacket is to prevent the liquid ozone in the glass bed trap from vaporizing and being conducted to the outlet too quickly after being received in the discharge portion 22. Rapid vaporization of liquid ozone, particularly in a relatively wide chamber, increases the likelihood of the ozone detonating. Thus, the combination of the glass bed extending above the lowermost portion of liquid oxygen, the insulation jacket and the exterior of the exposed neck at the outlet end of the discharge portion provides a form of temperature gradient across the body of liquid ozone in the trap. This allows the liquid ozone to be gradually displaced toward the lower and warmer part of the glass bed where it will be volatilized to a gas and exit from the bottom of the generator.

In an ozone generator in accordance with the disclosed preferred embodiment, the discharge port 23 will be substantially at the point of use 43 for the ozone gas, i.e., ozone gas from port 23 would be channeled directly through waste water when the generator is used in a waste treatment system. Of course, should the point of use be remote from the port 23, it is contemplated that a glass bead bed be extended within the conduit means which conduct the ozone from port 23 to the point of use and suitable insulation means be provided if needed to provide for a smooth transition of ozone to its gaseous state at the point of use.

In this manner the liquid ozone will be volatilized to a gaseous form in a smooth, continuous, controllable manner while at the same time the input gaseous oxygen will be prevented from escaping from the reaction chamber. This provides a particularly efficient ozone generation system which is highly efficient to react a substantial portion, that is at least 90 percent of the input oxygen and convert it into ozone, as may be seen by the following table:

| Primary Volts | Back Pressure (in H$_2$O) | Oxygen Flow Rate (cc/min) | Oxygen Flow Rate mg/min | Sample Time (min.) | Generator Production Rate g/hr | Oxygen Flow During Sampling mg | Ozone Produced (by sampling) mg | Oxygen to Ozone Conversion Efficiency | Watts to generator during sampling | g/Kwhr |
|---|---|---|---|---|---|---|---|---|---|---|
| Total run time — 30 min. | | | | | | | | | | |
| 90 | ½ | 64.3 | 92. | 5 | 2.88 | 30.6 | 16.0 | 52.3 | 18.9 | 151.6 |
| 90 | ¼ | 64.3 | 92 | 15 | 3.46 | 30.6 | 19.2 | 62.7 | 20.0 | 172.8 |
| 90 | ⅜ | 64.3 | 92 | 30 | 3.28 | 30.6 | 18.2 | 59.5 | 19.8 | 165.5 |
| | | | | | | | Run Average | 58.2 | | |
| Total run time — 30 min. | | | | | | | | | | |
| 90 | 0 | 33.2 | 47.5 | 5 | 3.04 | 15.9 | 16.9 | 106. | 19.0 | 160.1 |
| 90 | 0 | 33.2 | 47.5 | 15 | 3.19 | 15.9 | 17.7 | 111. | 19.0 | 177.0 |
| 90 | 0 | 33.2 | 47.5 | 30 | 2.75 | 15.9 | 15.3 | 96.2 | 18.0 | 153.0 |
| | | | | | | | Run Average | 104.5 | | |
| Total run time — 45 min. | | | | | | | | | | |
| 80 | 0 | 23.5 | 33.6 | 5 | 1.93 | | 10.7 | 95.5 | 14.0 | 137.6 |
| 80 | 0 | 23.5 | 33.6 | 30 | 2.27 | 11.2 | 12.6 | 112 | 13.0 | 174.5 |
| 80 | 0 | 23.5 | 33.6 | 45 | 2.00 | 11.2 | 11.1 | 99.1 | 13.0 | 153.7 |
| | | | | | | | Run Average | 102.2 | | |

Sample duration for all tests was 20 seconds.
Pressure — reported as if STP
Temperature — ambient It will be readily obvious to those of ordinary skill in the art that the determinations of the conversion efficiency and the electrical efficiency as shown in the table are, of course, dependent upon the amounts of ozone produced. Therefore, sampling of the ozone is necessary for such determinations. The sampling of the ozone is effected in a manner which is set forth hereinafter.

Referring to the table, it will be noted that with a set primary input voltage, and with the oxygen flow rate regulated in a manner so as to eliminate back pressure the conversion efficiency (i.e., the percentage of oxygen converted to ozone) is at least 90 percent.

It will be further evident by reference to the above table that electrical efficiency is independent of conversion efficiency. With the primary voltage constant at 90 volts the electrical efficiency remained substantially unchanged regardless of the elimination of back pressure within the system. Reduction of the primary voltage to 80 volts showed an electrical efficiency decrease. For the ozone generator represented by the table, reduction of the primary voltage to 70 volts resulted in the output of ozone decreasing linearly with time. Thus, at 70 volts, no new (or very little) ozone was being produced. The residue in the heat exchanger was evaporating at 12 psia.

From the foregoing discussion, it has been determined that for the ozone generator, in accordance with one preferred embodiment of the present invention, a primary voltage of between 80 and 90 volts will yield particularly satisfactory results. Of course, it will be readily evident that other input voltages and oxygen flow rates may be satisfactory depending upon the dimensions of the reaction chamber and the heat exchanger. Although the illustrated embodiment of the invention utilizes glass beads to form a bed in which a body of liquid ozone is trapped, if desired, the trap could be formed other ways. Specifically, coiled glass tube having one or more turns could be used to trap a body of liquid ozone and seal the outlet portion of the reaction chamber.

An advantageous method of sampling of the ozone involves reaction of ozone with an iodide ion, and quantification of the resulting iodine by titration with thiosulfate. The reactions between ozone and iodide, and between iodine and thiosulfate, are well known, as is the method of quantification by means of titration. Thus, the reactions and the method of titration are well established and need not be further elaborated upon.

Figure 4:
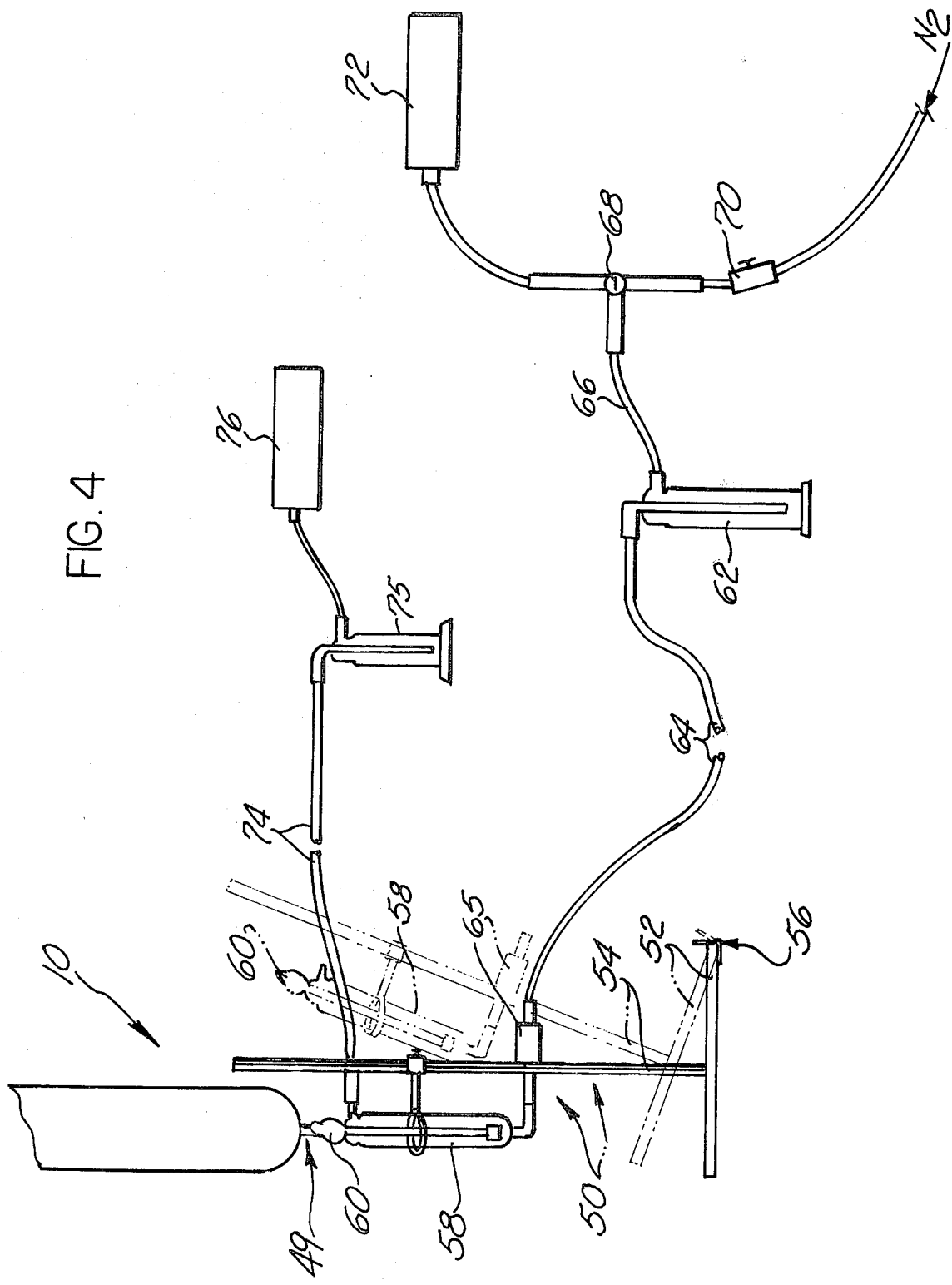
FIG. 4 is a schematic cross-sectional view of the ozone generator combined with means for sampling the ozone output from the generator.

The apparatus for sampling the ozone may be best understood by reference to FIG. 4. It should be noted that the sampling apparatus is particularly designed to virtually eliminate the likelihood of exposure of an operator to the very toxic ozone gas, and yet not necessitate the efficiency loss which would result if personal safety requirements dictated a shutting down of the generator removal of the sampling apparatus.

Referring to FIG. 4, the ozone generator outlet is generally indicated at 49. The sampling apparatus includes a sampling fixture, designated 50, and which comprises a flat base 52 and a vertical standard 54 extending therefrom. Base 52 is hingedly mounted, as at 56, for rotation by suitable remotely controlled means (not shown) about a horizontal axis. Vertical standard 54 supports container 58. Fluid conduit 60 which communicates at its upper end with generator outlet 49 when the container is under the generator outlet (shown by full line position of FIG. 4) extends toward the lower portion of container 58.

Sample bottle 62 is filled with sampling solution. In the preferred embodiment of the present invention the sampling bottle is filled with 350 ml of 2% aqueous KI solution. As seen in FIG. 4 sampling bottle 62 communicates with the lower portion of container 58 through Tygon tube 64 and solenoid valve 65. Sampling bottle 62 also communicates, through tube 66, with stopcock 68 which can place the bottle in fluid communication either with a source of $N_2$ gas (not shown), or with a sample bottle vacuum pump 72. The upper portion of container 58 communicates, through Tygon type tubing 74, with a gas wash bottle 75 which in turn communicates with sampling apparatus vacuum pump 76.

In the generation of the sampling apparatus with the sample fixture rotated to the dotted-line position of FIG. 4, the sample bottle 62 is filled with 350 ml of 2% aqueous KI solution. With stopcock 68 turned to the $N_2$ as side and the solenoid valve open, an $N_2$ gas valve 70 is operated to allow $N_2$ to flow into sample bottle 62 to force the KI solution into container 58. When $N_2$ bubbles are observed in container 58 the solenoid valve 65 is closed and the sampling fixture rotated to a position under the ozone generator outlet.

Next, the vacuum pump 76 is started and the resulting vacuum in the container 58 tends to aspirate ozone gas into the KI solution. Upon detection of ozone in the container 58 (the point at which the KI solution first begins to change color) a timer (in the preferred embodiment a stopwatch) is operated to get an accurate sampling period measurement. After the sampling period the vacuum pump 76 is turned off, the sampling fixture is rotated out of communication with the generator outlet, the stopcock 68 is turned to the vacuum side, solenoid valve 65 is opened and vacuum pump 72 is stated. Operation of vacuum pump 72 draws the reacted KI solution into the sampling bottle 62. When all the KI solution is thus collected in the sampling bottle the vacuum pump 72 is turned off. The sample bottle 62 is removed from the system and conventional titration apparatus is employed to determine the amount of ozone during the sampling period.

Cleaning of the sampling apparatus is then effected. A bottle containing approximately 400 ml of distilled water is connected in the system in place of sample bottle 62. The $N_2$ gas supply is operated to pump the water into container 58. Vacuum pump 72 then pumps the water back into the water bottle and the bottle is removed. Additional water bottles are inserted, in turn, in the system and the water therefrom is pumped into container 58 and back into the bottle until the system is clean.

The foregoing specification has thus disclosed an ozone generation system which is safe, efficient, and otherwise advantageous. The invention disclosed therein is defined by the following claims.

What is claimed is:

1. Apparatus for use in converting oxygen to concentrated ozone comprising means for defining a reaction chamber, conduit means for conducting oxygen to said reaction chamber, means for converting the oxygen in said reaction chamber to liquid ozone, said reaction chamber having an outlet portion through which ozone is conducted, means for maintaining a body of liquid ozone in said outlet portion for blocking flow of unreacted oxygen through the outlet portion, and means for suppressing the explosive decomposition of the concentrated ozone including means for segregating said concentrated ozone into volumes of controlled size.

2. Apparatus as set forth in claim 1 wherein said means for suppressing the explosive decomposition comprises a plurality of glass particles disposed in said outlet portion that prevent explosive decomposition of the ozone, said glass particles having a mesh size of 48 to 64 U.S. mesh.

3. Apparatus as set forth in claim 1 wherein said means for converting oxygen into concentrated ozone includes a pair of spaced apart electrodes having a dielectric disposed therebetween, means for providing a high voltage potential across said electrodes sufficient to form gaseous ozone, and means for cooling the gaseous ozone to condense it to liquid ozone.

4. Apparatus as set forth in claim 1 wherein said means for converting oxygen into liquid ozone includes a pair of spaced apart electrodes having a dielectric disposed therebetween, one of said electrodes including means for at least partially holding a body of liquid at cryogenic temperatures, and means for activating said electrodes to convert oxygen vapor to ozone at a temperature below its boiling temperature.

5. Apparatus as set forth in claim 1 further including means for directing the ozone gas to a use location where it is mixed with another material, and wherein said means for suppressing the explosive decomposition extends to said use location.

6. Apparatus as defined in claim 1 further including means for continuously directing oxygen into said reaction chamber and for continuously directing gaseous ozone from said body of liquid ozone.

7. Apparatus as defined in claim 6 an inner surface of said body of liquid ozone is exposed to said reaction chamber and an outer surface of said body of liquid ozone is in fluid communication with an outlet passage in the outlet portion of said reaction chamber.

8. Apparatus for use in converting oxygen to ozone, said apparatus comprising means for defining a reaction chamber, means for continuously directing oxygen to said reaction chamber, means for continuously directing oxygen to said reaction chamber, means for converting the oxygen in said reaction chamber to a body of liquid ozone, said reaction chamber having an outlet portion through which ozone is conducted from said reaction chamber, means for blocking the flow of unreacted oxygen from said outlet, and means for providing continuous vaporization of ozone from the body of liquid ozone and discharge of gaseous ozone from said reaction chamber.

9. Apparatus as defined in claim 9 wherein said means for blocking the flow of unreacted oxygen from said outlet portion comprises means for maintaining a body of liquid ozone in said outlet portion 10. Apparatus as set forth in claim 9, and further including means for maintaining a plurality of glass particles in said outlet portion, said glass particles having a mesh size of 48 to 64 U.S. mesh, thereby suppressing the tendency of the ozone toward explosive decomposition.

11. Apparatus as set forth in claim 10 wherein said outlet portion includes an outlet port, and said means for providing for continuous discharge of gaseous ozone includes means for locating said body of liquid ozone comprising means for locating a first portion in exposure to said reaction chamber and means for locating a second portion in exposure to said outlet port and means for providing a temperature gradient between the first and second portions with the ozone at said second portion being at the higher temperature to promote vaporizing of the ozone from a surface of said second portion.

* * * * *